United States Patent [19]

Takeshima et al.

[11] Patent Number: 5,444,622
[45] Date of Patent: Aug. 22, 1995

[54] METHOD OF CONTROLLING ELECTRIC POWER STEERING APPARATUS

[75] Inventors: Sadao Takeshima; Tomoyuki Ishii, both of Saitama, Japan

[73] Assignee: Jidosha Kiki Co., Ltd., Tokyo, Japan

[21] Appl. No.: 220,455

[22] Filed: Mar. 30, 1994

Related U.S. Application Data

[63] Continuation of Ser. No. 999,563, Dec. 30, 1992, abandoned, which is a continuation of Ser. No. 742,716, Aug. 5, 1991, abandoned, which is a continuation of Ser. No. 411,724, Sep. 25, 1989, abandoned.

[30] Foreign Application Priority Data

Sep. 30, 1988 [JP] Japan .................. 63-246191

[51] Int. Cl.$^6$ ............................................. B62D 5/04
[52] U.S. Cl. .......................... 364/424.05; 180/79.1; 180/142
[58] Field of Search ............... 364/424.05; 180/79.1, 180/141, 142, 143

[56] References Cited

U.S. PATENT DOCUMENTS

| | | | |
|---|---|---|---|
| 4,538,698 | 9/1985 | Hashimoto et al. | 180/79.1 |
| 4,730,686 | 3/1988 | Shimizu | 180/79.1 |
| 4,735,271 | 4/1988 | Shimizu | 180/79.1 |
| 4,754,829 | 7/1988 | Shimizu | 180/79.1 |
| 4,802,544 | 2/1989 | Maeda | 180/79.1 |
| 4,834,203 | 5/1989 | Takahashi et al. | 180/79.1 |
| 4,842,088 | 6/1989 | Oshita et al. | 180/79.1 |

FOREIGN PATENT DOCUMENTS 59-130780  7/1984  Japan .

*Primary Examiner*—Gary Chin
*Attorney, Agent, or Firm*—Blakely, Sokoloff, Taylor & Zafman

[57] ABSTRACT

In a method of controlling an electric power steering apparatus by controlling a drive force of a steering force assisting electric motor when a vehicle speed is lower than a predetermined speed and controlling a braking force of the electric motor when the vehicle speed exceeds the predetermined speed, a steering wheel forward or reverse turning state is determined in accordance with a change in steering torque when the vehicle speed exceeds the predetermined state. The braking force of the electric motor is controlled only when the steering wheel reverse turning state is detected.

2 Claims, 6 Drawing Sheets

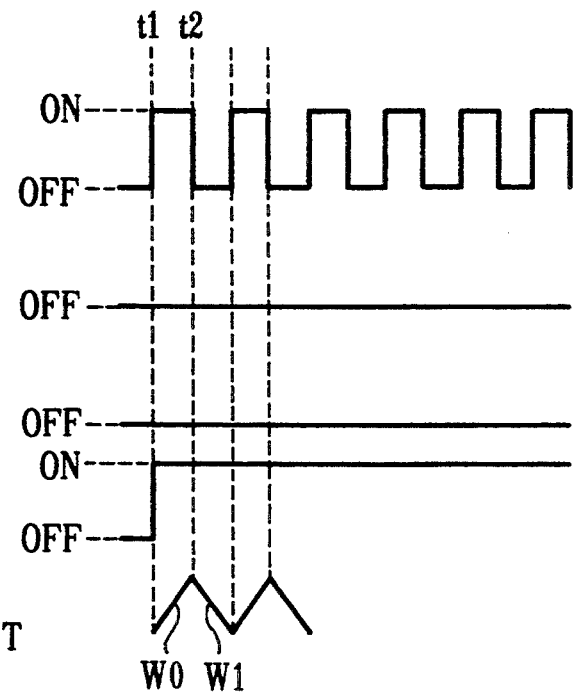
FIG.4A FET 1
FIG.4B FET 2
FIG.4C FET 3
FIG.4D FET 4
FIG.4E MOTOR CURRENT
FIG.5A FET 1
FIG.5B FET 2
FIG.5C FET 3
FIG.5D FET 4
FIG.6A FET 1
FIG.6B FET 2
FIG.6C FET 3
FIG.6D FET 4

METHOD OF CONTROLLING ELECTRIC POWER STEERING APPARATUS

This is a continuation of application Ser. No. 07/999,563 filed Dec. 30, 1992 which is a continuation of application Ser. No. 07/742,716 filed Aug. 5, 1991 which is a continuation of application Ser. No. 07/411,724 filed Sep. 25, 1989.

BACKGROUND OF THE INVENTION

The present invention relates to a method of controlling an electric power steering apparatus for assisting a steering force by using an electric motor and, more particularly, to a method of controlling a motor driver using an H bridge circuit.

Vehicle convergence and hence straight driving are degraded at a high speed of 50 km/h or more for a compact automobile or 100 km/h or more for a standard automobile. In order to solve this problem, in a typical electric power steering apparatus mounted in a conventional automobile, mechanical engagement between an output shaft of an electric motor and a reduction gear is released by an electromagnetic clutch, and at the same time the electric motor is powered off. Therefore, the assisting steering force at high-speed traveling of the automobile is interrupted to improve stability or convergence of the power steering apparatus.

According to the above conventional method, however, convergence at high-speed traveling is degraded by a mechanical inertia. In particular, stability in straight traveling at the rapid start is degraded.

In order to solve the conventional problem described above, a technique is proposed to cut off the power from the electric motor of the power steering apparatus and short-circuit an armature circuit through a braking resistor when a vehicle speed exceeds a predetermined speed, thereby braking the electric motor and hence improving convergence of the power steering apparatus during high-speed traveling. This technique is disclosed in U.S. Pat. No. 4,538,698.

SUMMARY OF THE INVENTION

It is, therefore, a principal object of the present invention to provide a method of controlling an electric power steering apparatus by improving a steering feeling during high-speed traveling.

In order to achieve the above object of the present invention, when a steering wheel is operated during high-speed traveling, its operation is discriminated as forward turning (the steering wheel is initially turned) or reverse turning (the steering wheel is turned back). When reverse turning is detected, the electric motor of the power steering apparatus is braked.

According to an aspect of the present invention, there is provided a method of controlling an electric power steering apparatus by controlling a drive force of a steering force assisting electric motor when a vehicle speed is lower than a predetermined speed and controlling a braking force of the electric motor when the vehicle speed exceeds the predetermined speed, comprising the steps of determining a steering wheel forward or reverse turning state in accordance with a change in steering torque when the vehicle speed exceeds the predetermined state, and controlling the braking force of the electric motor only when the steering wheel reverse turning state is detected.

BRIEF DESCRIPTION OF THE DRAWINGS

FIGS. 4A to 6D are waveform charts for explaining operations of field effect transistors (FETs) constituting an H bridge circuit used in FIG. 1;

DESCRIPTION OF THE PREFERRED EMBODIMENT

Figure 1:
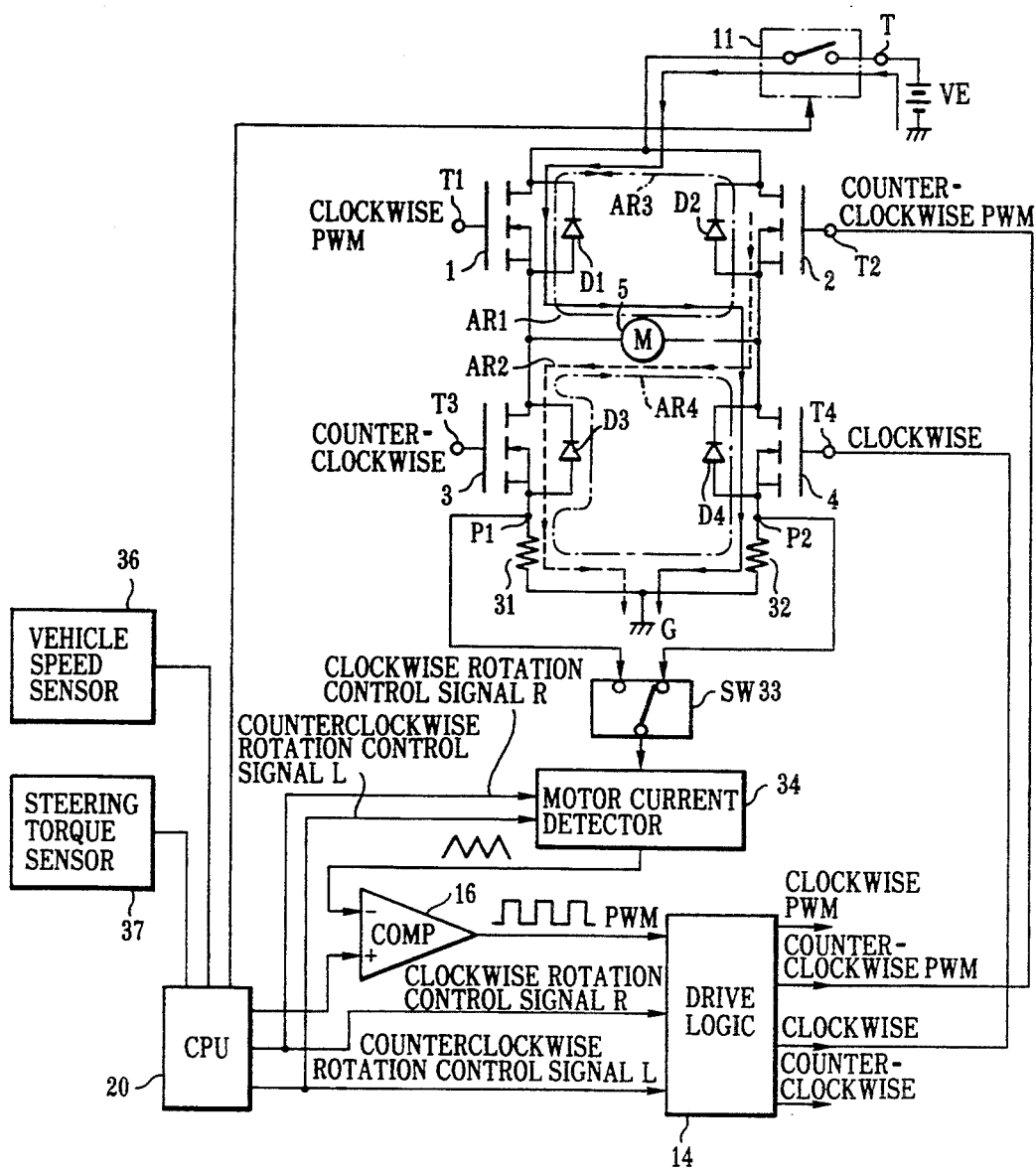
FIG. 1 is a view showing a basic arrangement of a vehicle power steering apparatus according to an embodiment of a method of controlling an electric power steering apparatus.

FIG. 1 shows a basic arrangement of a vehicle power steering apparatus showing an embodiment of a method of controlling the electric power steering apparatus. A motor driver using an H bridge circuit for driving an electric motor 5 is used as a major component of the power steering apparatus. The H bridge circuit comprises four field effect transistors (FETs) 1, 2, 3, and 4. The motor 5 is connected between a connecting point between the output electrodes of the FETs 1 and 3 and a connecting point between the output electrodes of the FETs 2 and 4. The connecting point of the output electrodes of the FETs 1 and 2 is connected to a positive power source VE through a relay 11. The connecting point between the output electrodes of the FETs 3 and 4 is connected to a ground potential as the other power source potential. The input electrodes of the FETs 1 to 4 are connected to a drive logic 14 serving as a control signal generator through terminals T1 to T4. The drive logic 14 receives a PWM signal and a clockwise rotation control signal R and a counterclockwise rotation control signal L from a CPU 20 and performs an arithmetic operation in accordance with logics of the following table. The drive logic 14 supplies outputs to the input electrodes of the respective FETs 1 to 4 or the terminals T1 to T4.

| Input to Drive Logic 14 | | | Output from Driver Logic 14 | | | |
| --- | --- | --- | --- | --- | --- | --- |
| PWM | R | L | T1 | T2 | T3 | T4 |
| 0 | 0 | 0 | 0 | 0 | 0 | 0 |
| 0 | 0 | 1 | 0 | 0 | 0 | 0 |
| 0 | 1 | 0 | 0 | 0 | 0 | 0 |
| 0 | 1 | 1 | 0 | 0 | 0 | 0 |
| 1 | 0 | 0 | 1 | 1 | 0 | 0 |
| 1 | 0 | 1 | 0 | 1 | 1 | 0 |
| 1 | 1 | 0 | 1 | 0 | 0 | 1 |
| 1 | 1 | 1 | 0 | 0 | 0 | 0 |

The FETs 1 to 4 shown in FIG. 1 are ON/OFF-controlled (FIGS. 4A to 6D) in response to the outputs from the drive logic 14, so that a current shown in FIG. 4E flows in the motor 5. In this case, the lower FETs 3 and 4 are operated to determine a rotational direction of the motor 5, and the upper FETs 1 and 2 controls rotation/nonrotation of the motor 5 and braking of the motor 5 which is a characteristic feature of the present invention. Diodes D1 to D4 are connected in parallel with the output electrodes of the FETs 1 to 4 to prevent the FETs from being damaged by a spark generated on the basis of a counterelectromotive force induced by the motor 5 or its excition coil. Current detection resistors 31 and 32 are inserted between ground and the output electrodes of the third and fourth FETs 3 and 4. A connecting point P1 between the third FET 3 and the current detection resistor 31 and a connecting point P2 between the fourth FET 4 and the current detection resistor 32 are connected to a motor current detector 34 through a switch 33. The switch 33 connects the connecting point P1 or P2 to the motor current detector 34 upon reception of a clockwise or counterclockwise rotation control signal R or L from the CPU 20. An output from the motor current detector 34 is a sawtooth output as a whole, as shown in FIG. 4E. The saw-tooth output is input to the inverting input terminal of a comparator 16. The noninverting input terminal of the comparator 16 receives a command value from the CPU 20. The comparator 16 determines whether the output from the motor current detector 34 is larger than the output from the CPU 20. Therefore, the comparator 16 outputs a pulse width modulated signal PWM to the drive logic 14.

The CPU 20 also receives outputs from a vehicle speed sensor 36 and a steering torque sensor 37. The CPU 20 also controls driving of the relay 11.

An operation of the arrangement shown in FIG. 1 will be described with reference to FIGS. 4A to 6D.

An operation except for high-speed traveling will be described below.

The relay 11 is energized by a signal from the CPU 20, and the H bridge circuit receives the power source voltage VE through a terminal T. In order to rotate the electric motor 5 in the forward direction, the FET 1 is turned on/off at a given duty ratio, and at the same time, the FET 4 is turned on and the FETs 2 and 3 are turned off. At time t1 in FIG. 4A to 4E, the FET 1 is set in the ON state, the FET 3 is set in the OFF state, the FET 2 is set in the OFF state, and the FET 4 is set in the ON state. Under these conditions, a current flows in a path AR1 of the terminal T1, the FET 1, the electric motor 5, the FET 4, the current detection resistor 32, and ground, so that the motor 5 is rotated in the forward direction. This state is maintained until time t2. When a current flows through the current detection resistor 32, a voltage drop occurs across the resistor 32. The voltage across the resistor 32 is applied to the motor current detector 34 through the switch 33. The voltage is then amplified and integrated by the motor current detector 34. The integrated voltage is applied to the inverting input terminal of the comparator 16. In this case, the motor current detector 34 incorporates an integrator, and the output from the motor current detector 34 is increased with a given time constant, as indicated by W0 in FIG. 4E. The output from the motor current detector 34 becomes larger than the command value supplied from the CPU 20 to the noninverting input terminal of the comparator 16, the output from the comparator 16 goes low. The output from the comparator 16 is supplied to the drive logic 14, and its output goes low. As a result, at time t2, the FET 1 is turned off. At this time, a current flowing through the electric motor 5 becomes zero in principle. However, a regenerative current having a waveform W1 in FIG. 4E and a given time constant determined by the inductance of the excitation coil of the electric motor 5 flows in a path AR4 indicated by the alternate and short dashed line in FIG. 1. The current flowing through the path AR4 indicated by the alternate long and short dashed line is gradually decreased due to the current stored in the electric motor 5. When the voltage applied to the inverting input terminal of the comparator 16 becomes smaller than the signal supplied to the noninverting input terminal, the comparator 16 outputs a signal of high level to the drive logic 14. The FET 1 is then turned on, and the above operation is repeated.

When the electric motor 5 is rotated in the reverse direction, the FET 2 is turned on/off, the FETs 1 and 4 are kept off at a given duty ratio, as shown in FIGS. 5A to 5D. A current flows through the electric motor 5, as indicated by a broken arrow AR2 in FIG. 1, so that the electric motor 5 is rotated in the reverse direction.

An operation during high-speed traveling will be described below.

During high-speed traveling of the vehicle, the relay 11 is kept "open", and the power source voltage VE is not applied to the H bridge circuit. In this state, as shown in FIGS. 6A to 6D, the FETs 1 and 2 are synchronously turned on/off at given duty ratios. In this case, the FETs 3 and 4 are kept off. When the electric motor 5 is rotated by an external force, a current, i.e., an armature circuit current flows, as indicated by an arrow AR3 of the alternate long and short dashed line in FIG. 1, and therefore the electric motor 5 is braked. This braking force is determined by the duty ratios of the PWM signals for ON/OFF-controlling the FETs 1 and 2, as indicated by FIGS. 6A and 6B. Therefore, the braking force can be controlled by controlling the duty ratios. A technique for controlling a duty ratio is based on a vehicle speed signal or a steering force. FIG. 1 and FIGS. 6A to 6D exemplify a case wherein the FETs 1 and 2 are turned on/off to control the braking force of the electric motor 5. However, the FETs 3 and 4 may be turned on/off or the FETs 1 and 2 and the FETs 3 and 4 may be ON/OFF-controlled to obtain the same effect as described above.

Figure 2:
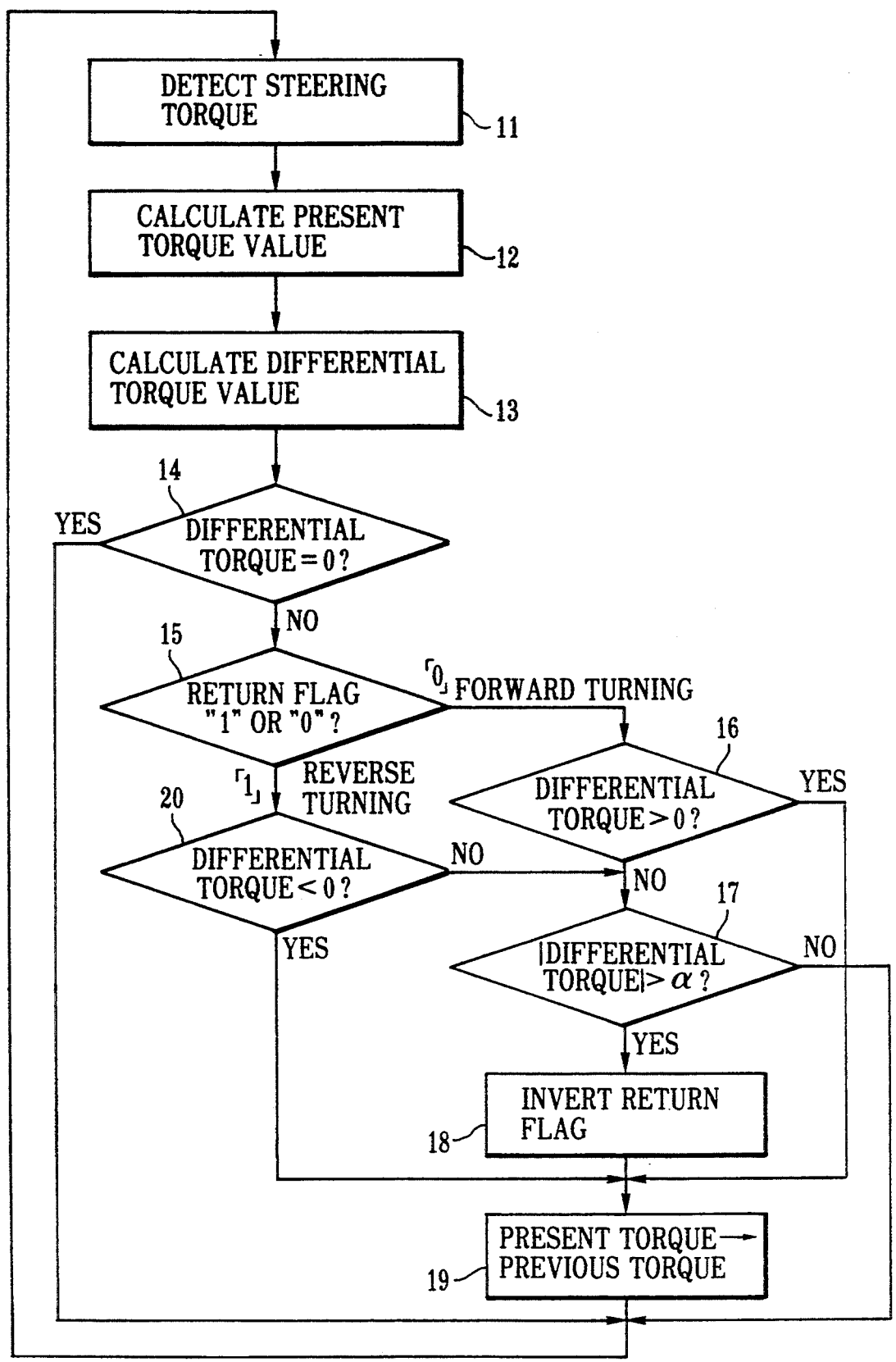
FIGS. 2 and 3 are flow charts for explaining an operation of the arrangement shown in FIG. 1.
Figure 3:
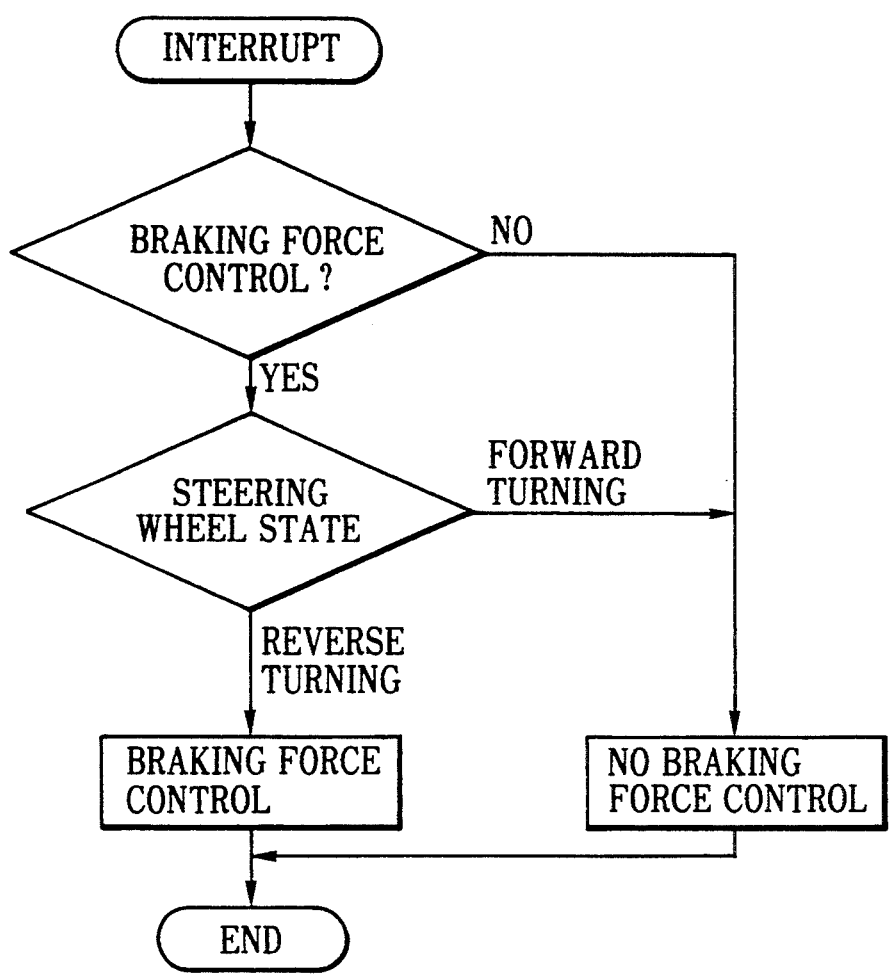

FIGS. 2 and 3 are flow charts for explaining a method of controlling electric power steering. FIG. 2 is a flow chart for determining a steering wheel state, and FIG. 3 is a flow chart showing control of the electric motor. Determination of the steering wheel in FIG. 2 and control of the electric motor in FIG. 3 are performed when the vehicle speed exceeds a predetermined speed, e.g., 50 km/h or more for a compact automobile. When the vehicle speed is lower than the predetermined speed, drive force control, i.e., steering force assisting described with reference to FIGS. 4A to 6D is performed.

Referring to FIG. 2, a steering torque is detected by the steering torque sensor 37 (step 11) to calculate (present torque value)=|(steering torque detection value)−(torque central value)| (step 12). The torque central value is defined as a value represented by a level S1 in FIG. 7. The steering torque detection value is defined as a value represented by a sinusoidal waveform S2. Reference symbol S3 denotes a PWM waveform applied to the FETs 1 and 2. When this waveform is output, the FETs 1 and 2 are kept on. However, the the waveform is not output, the FETs 1 and 2 are kept off. A differential torque value as a change in steering torque is calculated by subtracting the previous torque value from the present torque value (step 13). The flow advances to step 14 to determine whether the differential torque value is zero (the steering wheel is set neither in the forward nor reverse turning state). If YES in step 14, the flow returns to step 11. Otherwise, the flow advances to step 15 to determine whether a return flag is set to "0" or "1". If the return flag is set to "0" the flow advances to step 16 to confirm whether the differential torque is negative. The return flag of "0" indicates that the steering wheel is initially turned. The return flag of "1" indicates that the steering wheel is turned back.

Figure 7:
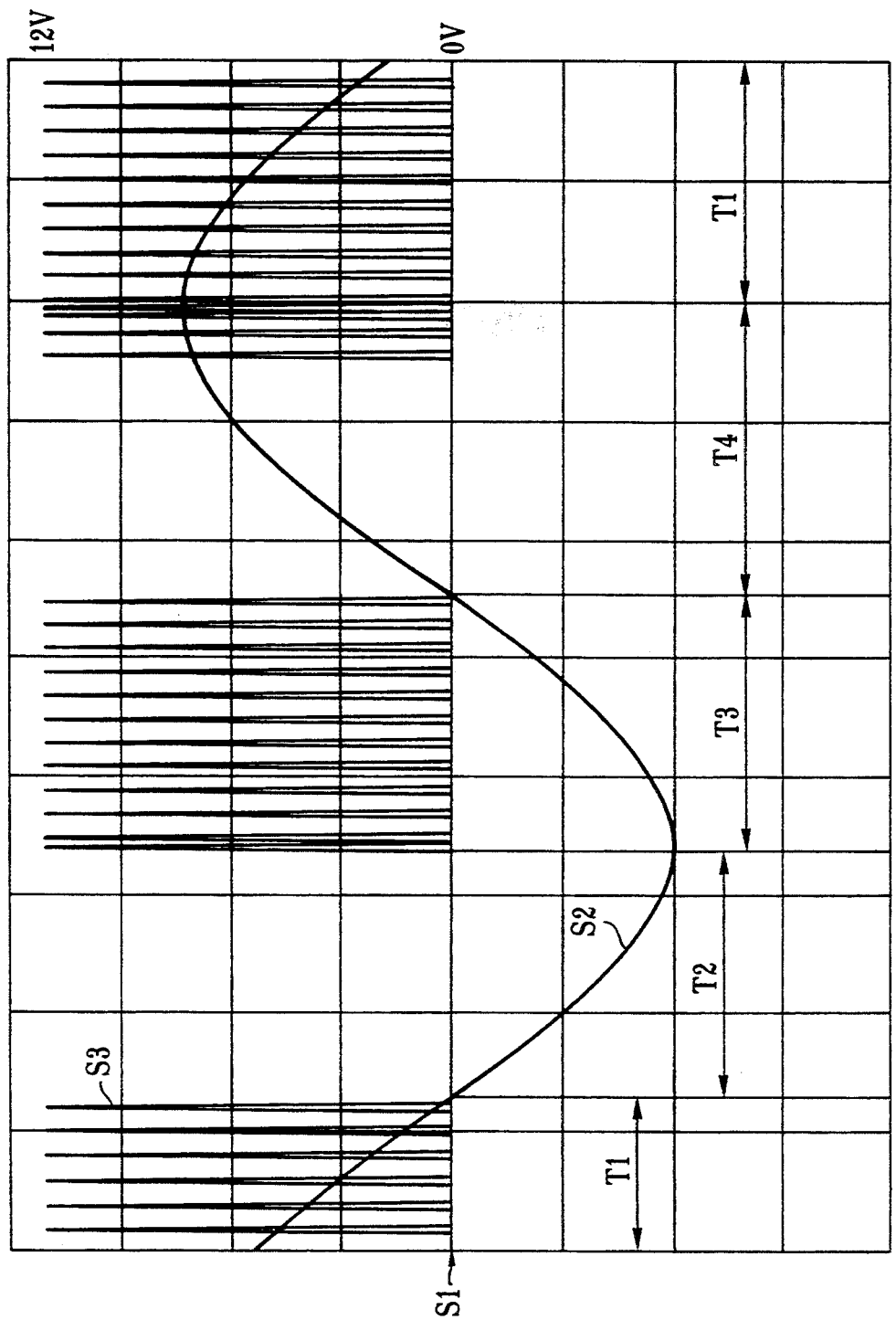
FIG. 7 is a timing chart for explaining an operating state of a steering wheel.

The relationship between the forward turning and the reverse turning will be described below. Referring to FIG. 7, time intervals T1 and T3 are steering wheel reverse turning intervals, while time intervals T2 and T4 are steering wheel forward turning intervals. As can be apparent from a steering torque detection value indicated by the waveform S2, the differential torque value is negative during the steering wheel reverse turning intervals. The differential torque value is positive during the steering wheel forward turning intervals.

Referring back to the flow chart of FIG. 2, it is determined in step 16 whether the differential torque is positive. If negative, the flow advances to step 17. During forward turning, since the differential torque is positive, the negative differential torque in step 17 represents a state wherein the steering wheel is turned back. It is then checked in step 17 whether an absolute value of the differential torque is larger than a given value $\alpha$. If YES in step 17, a change in steering wheel state is detected, and the return flag is inverted (step 18). The given value $\alpha$ is set to prevent erroneous detection of a change in steering wheel state by disturbance. If the differential torque is positive in step 16, the flow advances to step 19. The present torque value is set to be the previous torque value. When the differential torque is positive, the return flag is not inverted.

When the return flag is set to be "1" in step 15, the flow advances to step 20 to determine the differential torque is negative. The return flag is set to "1" in step 20, and the steering wheel reverse turning state is set. Therefore, the differential torque is negative. When the differential torque is negative, the flow advances to step 19. However, when the differential torque is positive, the steering wheel reverse turning state is not set. In this case, it is determined that the steering wheel state is changed from the reverse turning state to the forward turning state. The same operations as in steps 17 and 18 are performed.

The flow chart shown in FIG. 3 will be described below. This processing is performed by an interrupt of a predetermined period when the vehicle speed exceeds the predetermined speed. It is checked in step 21 whether braking force control of the electric motor is performed. If braking force control is set, the flow advances to step 22 to determine the steering wheel state by the return flag in FIG. 1. When the steering wheel reverse turning state is detected, braking force control is performed in step 23. However, when the steering wheel is set in the forward turning state, the flow advances to step 24 to interrupt braking force control.

Figure 8B:
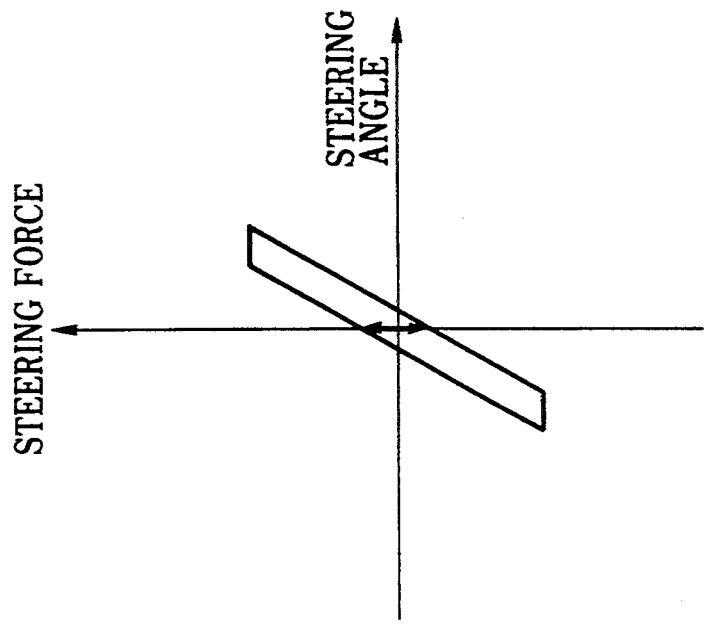
FIGS. 8A and 8B are graphs for explaining a steering feeling.
Figure 8A:
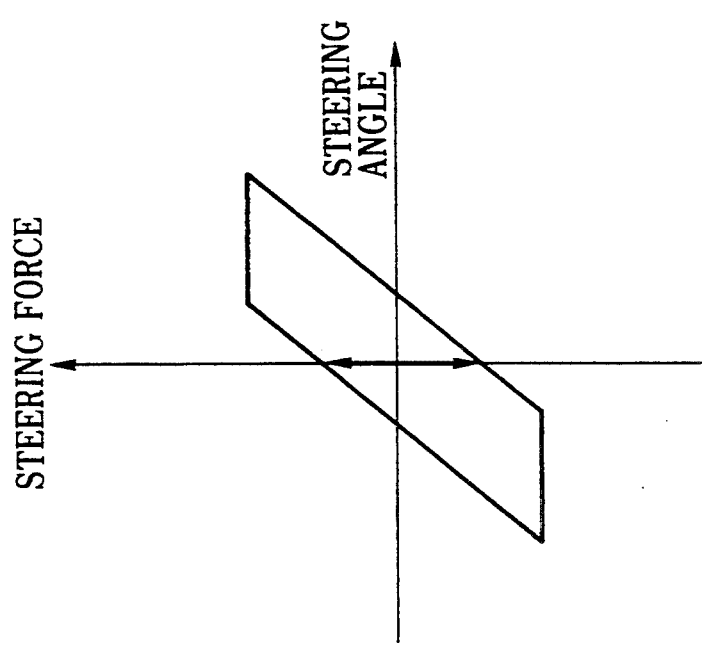

In this manner, the steering wheel state is determined to perform braking force control in only the steering wheel reverse turning state. Therefore, the operation during steering wheel forward turning can be facilitated and the steering feeling can be improved. At the same time, the convergence of the vehicle body can be maintained as in the conventional case. As indicated by double-headed arrows in FIGS. 8A and 8B, a steering force near the center of the steering angle for high-speed slalom is reduced to reduce a steering load. FIG. 8A shows characteristics of steering force vs. steering wheel angle in conventional high-speed slalom, and FIG. 8B shows characteristics of steering force vs. steering wheel angle in high-speed slalom according to the present invention.

The drive logic 14 used in the above embodiment may be arranged by a combination of logic circuits or replaced with a microcomputer. It is essential to operate the H bridge circuit in accordance with the tables described above or the waveforms shown in FIGS. 4A to 6D.

The H bridge circuit is constituted by FETs. However, the H bridge circuit may be constituted by 3-terminal switching elements such as bipolar transistors. Each switching element constituting each side of the H bridge may be constituted a plurality of parallel-connected elements.

According to the present invention as has been described above, the steering wheel forward or reverse turning state is determined in accordance with a change in steering torque when a vehicle speed exceeds the predetermined speed. The braking force of the steering force assisting electric motor is controlled during only steering wheel reverse turning. The steering force during steering wheel forward turning can be reduced, and the steering feeling can be improved.

What is claimed is:

1. A method for controlling an electric power steering apparatus by controlling a drive force of a steering force assisting electric motor when a vehicle speed is lower than a predetermined speed and by controlling a braking force of the electric motor when the vehicle speed exceeds the predetermined speed and when a steering wheel is only in a reverse turning state, said reverse turning state existing when the steering wheel is being turned back to an original state after being initially turned away from said original state, said electric motor being in an H bridge circuit, the H bridge circuit including a pair of first and second transistors and another pair of third and fourth transistors, the electric motor being connected between a connection of the first transistor and the third transistor and a connection of the second transistor with the fourth transistor, said method comprising the steps of:

detecting the reverse turning state of the steering wheel in accordance with a change in only the steering torque; and controlling the braking force of the electric motor by and through the pulse width modulation so that said braking force is controlled to short-circuit the electric motor when a pulse width modulation signal is inputted into one of said transistor pairs and the remaining paired transistors are off, and so that said pulse width modulation is performed at a predetermined duty ratio only during a substantial portion of the detected reverse turning state of the steering wheel when the vehicle speed exceeds the predetermined speed.

2. A method for controlling an apparatus by controlling a drive force of a steering force assisting electric motor when a vehicle speed is lower than a predetermined speed and by controlling a braking force of the electric motor when the vehicle speed exceeds the predetermined speed and when a steering wheel is only in a reverse turning state, said reverse turning state existing when the steering wheel is being turned back to an original state after being initially turned away from said original state, said electric motor being in an H bridge circuit, the H bridge circuit including a pair of first and second transistors connected in parallel and another pair of third and fourth transistors connected in parallel with the electric motor being connected between a connection of the first transistor and the third transistor and a connection of the second transistor with the fourth transistor, said method comprising the steps of:

detecting the reverse turning state of the steering wheel in accordance with a change in only the steering torque; and controlling the braking force of the electric motor by and through the pulse width modulation so that said braking force is controlled to short-circuit the electric motor when the pulse width modulation signal is inputted into one of said transistor pairs and the remaining paired transistors are off, and so that said pulse width modulations performed at a predetermined duty ratio only during a substantial portion of the detected reverse turning state of the steering wheel when the vehicle speed exceeds the predetermined speed.

\* \* \* \* \*